Jan. 4, 1927.
A. MEYER
1,613,237
FOOT REST FOR MOTOR VEHICLES
Filed April 18, 1925
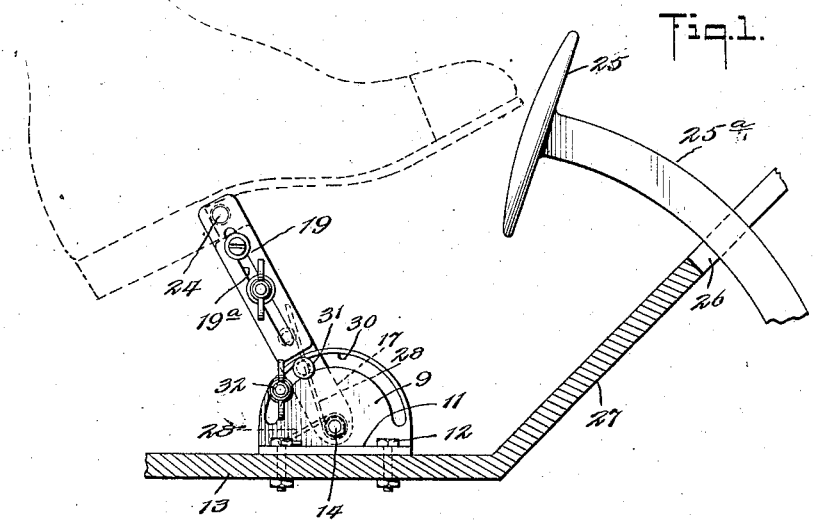
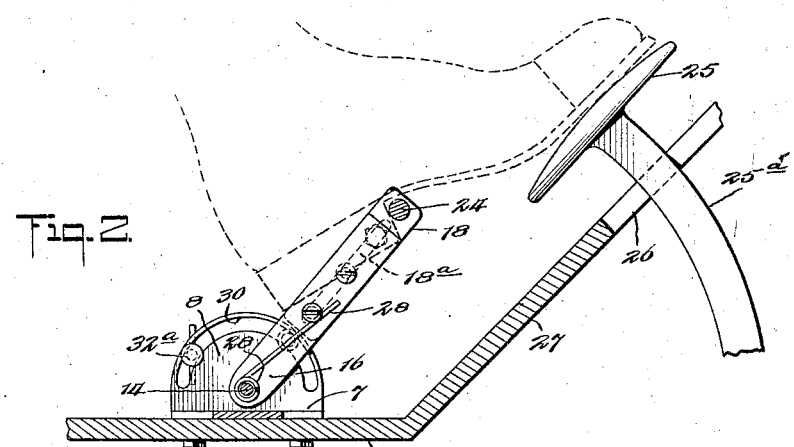
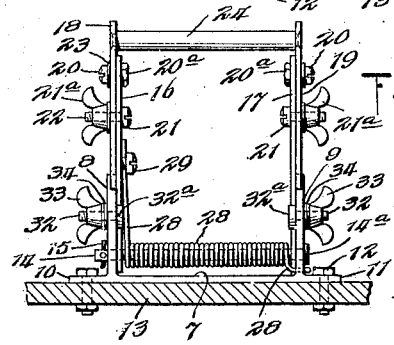
INVENTOR.
Adolph Meyer
BY
ATTORNEYS.

Patented Jan. 4, 1927.

1,613,237

UNITED STATES PATENT OFFICE.

ADOLPH MEYER, OF WOODHAVEN, NEW YORK, ASSIGNOR OF ONE-HALF TO HARRY A. ELFLAIN, OF WOODHAVEN, NEW YORK.

FOOT REST FOR MOTOR VEHICLES.

Application filed April 18, 1925. Serial No. 24,025.

The present invention relates broadly to improvements in motor-vehicles and is more especially directed to the provision of means for protecting the clutch mechanism against undue wear and for generally facilitating the movement of the clutch elements into and out of engagement.

As is well known, those motor-vehicles which are driven by an internal combustion engine embody a clutch mechanism whereby the motor may be connected to or disconnected from the drive shaft at will, the clutch elements being moved into and out of engagement by means of a pedal usually positioned in proximity to the left foot of the operator when the latter is seated behind the steering wheel.

The clutch elements, that is the male and female members of the cone type and the plates of the disc type are maintained in positive engagement by spring mechanisms of different design, the tension of the springs being so adjusted that said elements may be disengaged in opposition thereto with a minimum amount of effort on the part of the operator. It will be obvious therefore, that with the relatively delicate adjustment, any slight pressure upon the clutch pedal will permit a relative movement of greater or lesser degree of the clutch members in frictional contact, with a resultant amount of wear. Many operators, because of the absence of a suitable support for the clutch foot, and the desirability of keeping the same in position for operating the clutch pedal, habitually maintain contact therewith, the resulting foot pressure, however slight, ultimately serving to materially reduce the normal life of the engaging surfaces or parts of the clutch, with a consequent increase in the cost of maintenance or up-keep.

The general object of the present invention is to protect the clutch mechanism against that unnecessary wear which results from the application of pressure upon the operating pedal, except when required to function said mechanism, and thereby increase the durability thereof.

It is a further object of my invention to provide a means for insuring the maintenance of the foot of the operator of a motor-vehicle in position for instant application to the clutch pedal in a manner whereby the clutch members may be actuated into and out of engagement with the utmost facility and with a range of control which has not heretofore been possible of attainment.

More specifically, it is the object of my invention to provide a rest or support for the foot of the operator whereby the clutch pedal is manipulated, which is of a simple and economical construction and which may be readily applied to any type or make of motor-vehicle wherein its use may prove advantageous.

My invention further contemplates a foot rest or support having the aforesaid advantages and characteristics, which is adapted to move with the foot of the operator when the clutch pedal is depressed or permitted to return to its normal position, so that the foot is constantly supported in a pivotal position for obtaining the greatest ease in manipulation, means being provided for the relative adjustment of the parts of the device in order that a standardized structure may have a universal application in meeting the requirements of persons of different stature.

Other objects of my invention and advantages flowing from the practicing thereof, will present themselves as the description proceeds, and I would have it clearly understood that I reserve unto myself all rights to the full range of equivalents, both in structure and in use, to which I may be entitled under my invention in its broadest aspect.

For the purposes of the present disclosure, I have elected to illustrate and describe one embodiment of my invention, it being obvious that my invention may take other forms without departing from the spirit and scope thereof as defined in the appended claims.

In the drawings:

Figure 1 is a side elevation of a device embodying my invention, located in position upon the floor-board of the front compartment of a motor-vehicle.

Figure 2 is a view, similar to Figure 1, illustrating the relative positions of the device and the operator's foot, when the clutch pedal is depressed, the opposite half of the device being shown, and Figure 3 is a front elevation of the structure shown in Figures 1 and 2.

Referring now to the drawings in detail, in which like characters of reference are employed to designate similar parts in the several views, 7 indicates the base of the supporting bracket of the device, which may be a stamping or casting and embodies the preferably integrally formed oppositely disposed side or upright members 8 and 9, the base extending therebeyond in the form of flanges 10 and 11 which are suitably apertured to receive the bolts 12, whereby said bracket may be rigidly or immovably fastened to the floor-board 13 of the front or driver's compartment of the vehicle.

Positioned transversely of the base 7 is a shaft or rod 14, the ends of which are seated in suitable openings in the aforesaid side members 8 and 9, and adjacent to the lower edges thereof, the said shaft or rod being held against relative longitudinal movement by any suitable means. For example, one end of the rod or shaft may be formed with a head 14$^a$ to bear against the outer face of the bracket member 9, while the opposite end thereof, which protrudes through the side member 8, is drilled to receive a cotter pin 15, as clearly shown in Figure 3.

As will be observed, a pair of parallel arms 16 and 17 extend upwardly from the supporting bracket of the device, these arms being mounted for free rotation upon the shaft or rod 14 adjacent to the inner faces of the respective side members 8 and 9, against which they bear. Telescopically mounted on each of said arms 16 and 17 is an extension, 18 and 19, the latter of which are provided with medially disposed elongated slots 18$^a$ and 19$^a$, through which the bolts or studs 20 and 21, carried by the arms 16 and 17 project to receive the respective securing nuts 20$^a$ and 21$^a$. From this construction it will be seen that the extensions 18 and 19 which, like the arms 16 and 17, are preferably of flat stock, may be adjusted longitudinally of the latter by the simple expedient of turning off the nuts 20$^a$ and 21$^a$, one or both sets of which may be of the wing type, on their respective studs and moving the extensions to the desired position relative to the arms 16 and 17. The arms 16 and 17 and their extensions 18 and 19 may then be locked in positive frictional engagement by seating the respective nuts against the washers 22 and 23, which are carried upon the studs and bear against the outer faces of said extensions.

The upper extremities of the extensions 18 and 19 are connected by a rod or bar 24 which may be retained in position by any suitable means, this rod or bar forming a support or rest for the foot of the operator of the vehicle when in engagement with the forward part of the heel of the shoe, as shown in dotted lines in Figures 1 and 2.

Disposed upon the rod or shaft 14 is a coil spring 28, one end of which slidably bears against the pin or screw 29 projecting from the inner face of the arm 16, adjacent to the upper edge thereof, the other end of said spring being held within an opening located in the side member 9 at a point to the rear and below the axis of said shaft. This spring 28 is wound or tensioned to exert a force which will constantly tend to maintain the parallel arms and their extensions at their rearward limit of movement, when the device is in functioning position as shown in Figures 1 and 2, as determined by the termini of the arcuate or semi-annular slots 30 in the respective side members 8 and 9, which slots forms guideways for the lugs or projections 31 formed integral with or otherwise fixed to the arms 16 and 17.

From the description thus far given, it will be seen that the supporting bracket is adapted to be fixed to the floor-board of the driver's compartment of a motor-vehicle to the rear of and in line with the clutch pedal 25, the shank or lever 25$^a$ of which is reciprocable within the slot or opening 26 in the toe-board 27.

When the device has been so mounted, the extensions 18 and 19 are adjusted relatively to the arms 16 and 17 to support the left foot of the operator at the proper height when the clutch pedal is in its normal position, as shown in Figure 1. The limit of the rearward inclination of the arms 16 and 17, in response to the influence of the spring 28 may then be fixed by the adjustment of the stops 32 within the slots 30 against which the side edges of the arms 16 and 17 are adapted to abut, these stops, in the present showing, comprising bolts, the heads 32$^a$ of which engage the inner margins of the slots 30, suitable wing nuts 33 and cooperating washers 34 on the projecting shanks of the bolts serving to enable the user to readily clamp the stops in the desired functioning position.

It is desirable, in practice, to fix the limit of rearward movement of the arms 16 and 17 at a point whereby the weight of the leg will be transmitted to the shaft 14 in a substantially straight line from the knee of the operator, when the rod 24 is engaged by the heel of his shoe as aforesaid, thus affording the greatest degree of comfort to the user. With the proper adjustment of the device, as described, the toe of the foot will be easily and comfortably maintained out of contact with the clutch pedal, but in sufficiently close proximity thereto, to enable instantaneous depression of the clutch pedal by the natural forward and downward movement of the foot, such as would obtain were the foot held in constant contact with said pedal. As the foot moves forwardly and downwardly in de-clutching, with the heel in engagement with the rod 24 as shown, the arms 16 and 17 are similarly rocked or rotated on their common axis in opposition to the tension of the spring 28, the resistance of which, however, does not increase the amount of effort ordinarily required to depress the clutch pedal, it being obvious that the sole function of this spring is to cause the rod 24 to maintain its position immediately in advance of the heel through the entire range of movement of the foot from and to its normal or supported position.

It is manifest that the foot of the operator pivots about the rod 24 in the forward and return movements of the device which may be termed a movable fulcrum, and, if desired, the rod 24 may be provided with a sleeve adapted to rotate thereon to protect the shoe against such wear as may result from the friction of the shoe rotating upon the fixed rod.

While I have described my invention with reference to the specific form herein shown, it will be manifest that the supporting bracket may be of a different design; also, that the arms and their extensions may be tubular or of other cross-section, or, that in lieu of said arms, a unitary foot supporting element may be rotatably mounted upon the bracket of the device, all of these modifications falling within the province of the invention which is directed to the attainment of the objects hereinbefore set forth.

Furthermore, the term clutch pedal, while specific in defining an element for actuating a particular control of a motor-vehicle, is also broadly used herein to apply to a brake pedal or any other control pedal in conjunction with which my invention may be employed.

What I claim is:

1. A device for positively supporting the weight of the foot of an operator of a motor-vehicle in position for bodily movement into engagement with a control pedal, comprising a base, a foot rest hinged thereto, said foot rest having a portion adapted to fit beneath the instep of the operator's foot, spring means for continuously maintaining said foot rest in contact with the instep of the operator's foot during the movement of the latter into and out of pedal actuating position and adjustable means for limiting the movement of the foot rest in one direction.

2. A device for supporting the foot of a motor-vehicle operator in position for actuating a control pedal, embodying a base, a foot rest connected thereto for relative forward and backward movement, said foot rest being spaced from and continuously out of contact with the control pedal, means for maintaining said foot rest in engagement with the operator's foot during its movements in actuating said pedal and to and from such actuating position, and means cooperating with said foot rest whereby the latter will provide a rigid support for the weight of the foot when in its normally inactive position.

3. A means for supporting the foot of a motor-vehicle operator in position for actuating a control pedal, comprising a fixed base, a device hinged thereto embodying means adapted for continuous engagement with the arch of the foot, while in its normally inactive position and during its forward and backward movements from and to such position, in the operation of the control pedal, spring means for maintaining such continuous engagement between the foot and the aforesaid means of said device and means associated with said base and cooperating with said device to provide a positive support for the weight of the foot when the latter is in its normally inactive position.

4. A device for supporting the foot of a motor-vehicle operator in position for and during forward and backward movement thereof for actuating a control pedal, comprising a base adapted to be fixed to the floor-board of a vehicle in spaced relation to the control pedal, a pair of upright arms having a pivotal connection with said base, means connecting said arms adjacent their upper ends, said means including a foot rest adapted to engage the operator's foot in the region of the arch, means for supporting said arms in a predetermined position to carry the weight of the foot and spring means connected to said base and to said arms for maintaining said foot rest in continuous engagement with the foot, said arms being capable of arcuate movement in response to the forward and backward movements of the operator's foot.

5. A device for carrying the weight of the leg and foot of a motor-vehicle operator, with the foot in a position spaced from and poised for direct engagement with the clutch pedal, said device including a fixed base, foot engaging means rotatably connected to said base, yieldable means for maintaining said foot engaging means in continuous contact with the foot during the forward and downward thrust of the leg and foot for engagement and actuation of the pedal by the latter and in the return movement of the foot to its normally inactive and supported position, and means whereby the supporting position of the foot engaging means may be adjusted at the will of the operator.

6. A foot rest for motor-vehicles comprising a base adapted to be attached to the floor of the driver's compartment of a motor-vehicle, adjacent a control pedal, a foot support embodying spaced arms and a connecting member adapted to fit beneath the instep of the driver's foot, hinged to said base, said support being vertically adjustable relative to said base, an adjustable stop cooperating with said support and said base to limit the rotative movement of said support in one direction and spring means for controlling the movement of said support in response to the movements of the foot resting thereupon.

ADOLPH MEYER.

CERTIFICATE OF CORRECTION.

Patent No. 1,613,237, granted January 4, 1927.

to ADOLPH MEYER ET AL.

It is hereby certified that the name of the assignee in the above mentioned patent was erroneously written and printed as Harry A. Elflain, whereas said name should have been written and printed as Harry A. Elflein, as shown by the records of assignments in this office and that the said Letters Patent should be read with this correction therein that the same may conform to the record of the case in the Patent Office.
Signed and sealed this 8th day of February, A. D. 1927.

William A. Kinnan,
Seal.  Acting Commissioner of Patents.